United States Patent
Hussain et al.

(10) Patent No.: US 9,258,215 B2
(45) Date of Patent: Feb. 9, 2016

(54) OPTICAL LAYER PROTECTION SWITCHING APPLICATIONS

(71) Applicant: Infinera Corp., Annapolis Junction, MD (US)

(72) Inventors: Iftekhar Hussain, Santa Clara, CA (US); Rajan Rao, Cupertino, CA (US); Ping Pan, San Jose, CA (US); Paul N. Freeman, Saratoga, CA (US); Radhakrishna Valiveti, Union City, CA (US)

(73) Assignee: Infinera Corporation, Sunnyvale, CA (US)

(*) Notice: Subject to any disclaimer, the term of this patent is extended or adjusted under 35 U.S.C. 154(b) by 205 days.

(21) Appl. No.: 14/144,843

(22) Filed: Dec. 31, 2013

(65) Prior Publication Data
US 2015/0334004 A1    Nov. 19, 2015

Related U.S. Application Data

(60) Provisional application No. 61/748,378, filed on Jan. 2, 2013.

(51) Int. Cl.
- *H04B 10/00* (2013.01)
- *H04L 12/707* (2013.01)
- *H04Q 11/00* (2006.01)
- *H04L 1/00* (2006.01)
- *H04B 10/032* (2013.01)

(52) U.S. Cl.
CPC ............. *H04L 45/22* (2013.01); *H04B 10/032* (2013.01); *H04L 1/0042* (2013.01); *H04Q 11/0003* (2013.01); *H04Q 11/0066* (2013.01); *H04Q 2011/0081* (2013.01)

(58) Field of Classification Search
USPC .......................................... 398/140, 141, 158
See application file for complete search history.

(56) References Cited

U.S. PATENT DOCUMENTS

| | | | | |
|---|---|---|---|---|
| 7,155,134 B2 * | 12/2006 | Azadet | ................ | H04B 10/503 375/286 |
| 7,278,081 B1 * | 10/2007 | Blair | ................... | H04L 1/0083 714/701 |
| 7,440,475 B2 * | 10/2008 | Kubo | ................ | H03M 13/2721 370/476 |
| 7,471,903 B1 * | 12/2008 | Friskney | ............ | H04B 10/5161 398/185 |
| 7,788,547 B1 * | 8/2010 | Oliva | ................... | H03M 13/612 358/426.09 |
| 8,401,400 B2 * | 3/2013 | Cai | ........................ | H04J 14/02 398/202 |
| 8,495,475 B2 * | 7/2013 | Kubo | ................... | H04J 3/1652 714/775 |
| 8,526,823 B2 * | 9/2013 | Swanson | ............ | H04B 10/0795 398/136 |
| 8,849,125 B2 * | 9/2014 | Sun | ........................ | H04J 14/06 398/140 |
| 8,867,926 B2 * | 10/2014 | Xie | ..................... | H04B 10/5053 398/152 |
| 2008/0092009 A1 * | 4/2008 | Miyata | .............. | H03M 13/2909 714/755 |
| 2008/0148127 A1 * | 6/2008 | Miyata | .............. | H03M 13/2906 714/755 |

(Continued)

*Primary Examiner* — Agustin Bello
(74) *Attorney, Agent, or Firm* — Dunlap Codding, PC; David L. Soltz

(57) ABSTRACT

Systems and methods are disclosed for modulating, with circuitry of a source node in a communication network, at least one optical carrier to carry data utilizing a format of a soft decision forward error correction (SD-FEC) data field of an overhead portion of a data frame; encoding, with the circuitry of the source node, first data being SD-FEC data and second data being additional data into the SD-FEC data field, the first and second data being accessible without accessing client data traffic; and transmitting, with the circuitry of the source node, the data frame including the soft decision forward error correction data field. In one implementation, the second data comprises automatic protection switching bytes.

22 Claims, 15 Drawing Sheets

(56) References Cited

U.S. PATENT DOCUMENTS

| | | | | |
|---|---|---|---|---|
| 2009/0269081 A1* | 10/2009 | Cai | H04L 1/0045 | 398/202 |
| 2010/0287449 A1* | 11/2010 | Kubo | H04J 3/1652 | 714/775 |
| 2010/0296601 A1* | 11/2010 | Kim | H03M 13/29 | 375/295 |
| 2011/0066911 A1* | 3/2011 | Yoshimoto | H04J 11/0023 | 714/748 |
| 2011/0122767 A1* | 5/2011 | Dent | H04L 5/20 | 370/228 |
| 2012/0076502 A1* | 3/2012 | Swanson | H04B 10/0795 | 398/136 |
| 2012/0183303 A1* | 7/2012 | Onohara | H04B 10/40 | 398/136 |
| 2012/0224846 A1* | 9/2012 | Swanson et al. | H04B 10/0705 | 398/13 |
| 2013/0294782 A1* | 11/2013 | Liboiron-Ladouceur | H04B 10/616 | 398/202 |
| 2014/0003814 A1* | 1/2014 | Sun | H04J 14/06 | 398/65 |
| 2014/0079394 A1* | 3/2014 | Xie | H04B 10/5053 | 398/65 |
| 2014/0208182 A1* | 7/2014 | Sakai | H03M 13/1117 | 714/755 |
| 2014/0219666 A1* | 8/2014 | Tselniker | H04L 25/03019 | 398/208 |

\* cited by examiner

OPTICAL LAYER PROTECTION SWITCHING APPLICATIONS

INCORPORATION BY REFERENCE

The present patent application claims priority to Provisional Patent Application U.S. Ser. No. 61/748,378 titled "Optical Layer Protection Switching Applications," filed on Jan. 2, 2013, the entire contents of which are hereby expressly incorporated herein by reference.

FIELD OF THE DISCLOSURE

The disclosure generally relates to methods and apparatuses for optical layer information transfer and protection switching in optical transport networks. More particularly the disclosure relates to methodologies and systems for general purpose high speed, long reach, client-payload agnostic, bidirectional communication channels.

BACKGROUND

Generalized Multiprotocol Label Switching (GMPLS) is a type of protocol which extends multiprotocol label switching (MPLS) to encompass network schemes based upon time-division multiplexing (e.g. SONET/SDH, PDH, G.709), wavelength multiplexing, and spatial switching (e.g. incoming port or fiber to outgoing port or fiber). Multiplexing is when two or more signals or bit streams are transferred over a common channel.

Wave-division multiplexing is a type of multiplexing in which two or more optical carrier signals are multiplexed onto a single optical fiber by using different wavelengths (that is, colors) of laser light.

Lightpaths, or optical channels, are optical connections carried over a wavelength, end to end, from a source node to a destination node in an optical network. Typically, the lightpaths pass through intermediate links and intermediate nodes in the network. At the intermediate nodes, the lightpaths may be routed and switched from one intermediate link to another intermediate link. In some cases, lightpaths may be converted from one wavelength to another wavelength at the intermediate nodes.

A switched network usually includes multiple switch nodes (also referred to as "nodes") which are connected by communication links. Within the network, user traffic can be transported between any two locations using predefined connections specifying particular links and/or switch nodes for conveying the user traffic.

An exemplary optical communication network may contain multiple optical nodes, such as optical line terminals (OLTs), optical crossconnects (OXCs), optical line amplifiers, optical add/drop multiplexer (OADMs) and/or reconfigurable optical add/drop multiplexers (ROADMs), interconnected by way of intermediate links. OLTs may be used at either end of a connection or intermediate link. OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers" and U.S. Pat. No. 7,394,953 titled "Configurable Integrated Optical Combiners and Decombiners", which are incorporated herein by reference in their entirety.

An exemplary optical communication network contains multiple "layers" such as electronic and optical layers. The electronic layer includes an optical channel transport unit (OTU) sub-layer and an optical channel data unit (ODU) sub-layer. The optical layer has multiple sub-layers, including the Optical Channel (OCh) layer (an OCh may contain one or more optical carriers), the Optical Multiplex Section (OMS) layer, and the Optical Transmission Section (OTS) layer. The optical layer provides optical connections, also referred to as optical channels or lightpaths, to other layers, such as the electronic layer. The optical layer performs multiple functions, such as monitoring network performance, multiplexing wavelengths, and switching and routing wavelengths. The Optical Channel (OCh) layer manages end-to-end routing of the lightpaths through the optical transport network (OTN). The Optical Multiplex Section (OMS) layer network provides the transport of optical channels through an optical multiplex section trail between access points. The Optical Transmission Section (OTS) layer network provides for the transport of an optical multiplex section through an optical transmission section trail between access points. The OCh layer, the OMS layer, and the OTS layer have overhead which may be used for management purposes. The overhead may be transported in an Optical Supervisory Channel (OSC).

The Optical Supervisory Channel (OSC) is an additional wavelength that is adapted to carry information about the network and may be used for management functions. The OSC is carried on a different wavelength than wavelengths carrying actual data traffic and is an out-of-band channel. Typically, the OSC is used hop-by-hop and is terminated and restarted at every node. The International Telecommunications Union (ITU) recommendation ITU-T G.709 further defines the OTS, OMS and OCh layers and recommends use of the OSC to carry overhead corresponding to the layers.

Typically, current systems use out-of-band communication channels (that is, a different wavelength than the wavelength carrying user data traffic) such as the Optical Supervisory Channel (OSC) to carry information about the network and for management functions. However, the OSC may not be available, or reliability of the system may be improved by redundant communication channels. Therefore, an in-band channel is needed to carry overhead information through an optical connection, such as from a source node to a destination node, such that the overhead information can still be accessed without accessing or affecting the payload data.

The present disclosure addresses these deficiencies with methodology and apparatuses for modulating one or more optical carriers to carry additional data in-band between a source node and a destination node in a network. The method may utilize a format of a soft decision forward error correction (SD-FEC) data field of an overhead portion of a data frame and encode additional data into the SD-FEC data field, along with SD-FEC data. The additional data being accessible without accessing user data traffic.

SUMMARY

A method and system are disclosed. The problem of in-band communication through an optical connection in a network is addressed through methods and systems for communicating overhead data within a soft decision forward error correction (SD-FEC) data field of an overhead portion of a data frame.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
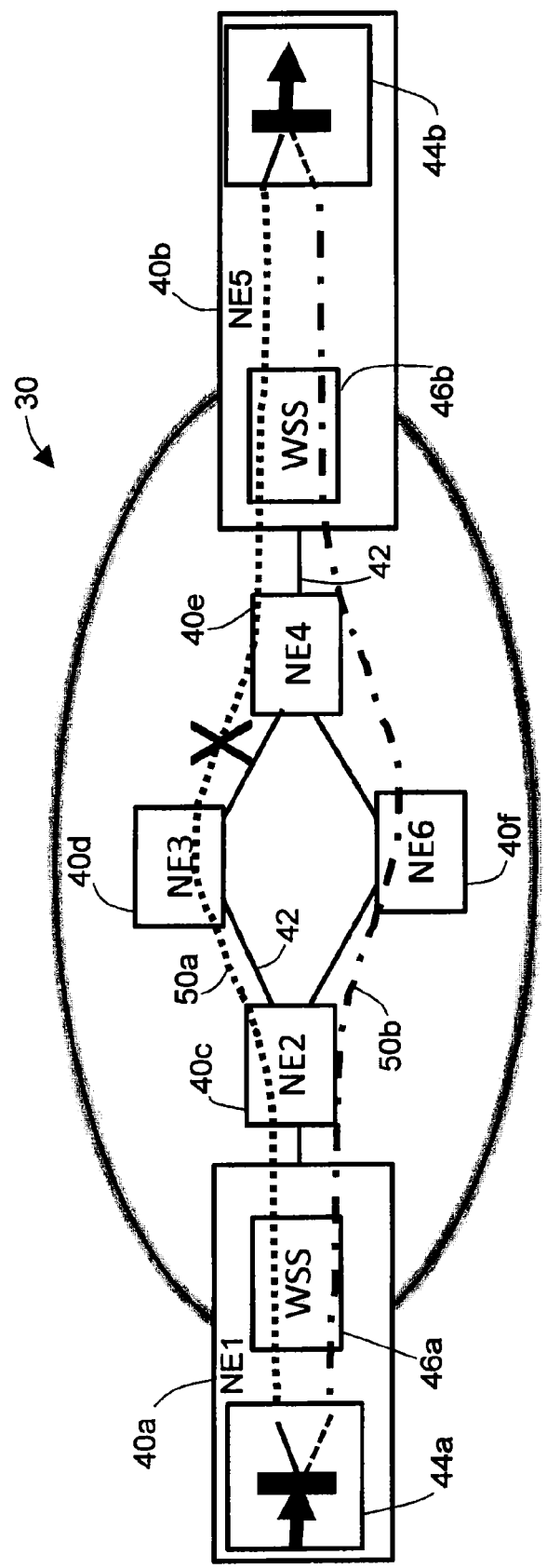
FIG. 1 is a schematic diagram of an exemplary optical communication network.

The following detailed description refers to the accompanying drawings. The same reference numbers in different drawings may identify the same or may identify similar elements.

The mechanisms proposed in this disclosure circumvent the problems described above. The present disclosure describes methods and systems for modulating, with circuitry of a source node in a communication network, at least one optical carrier to carry data utilizing a format of a soft decision forward error correction (SD-FEC) data field of an overhead portion of a data frame; encoding, with the circuitry of the source node, first data being SD-FEC data and second data being additional data into the SD-FEC data field, the first and second data being accessible without accessing client data traffic; and transmitting, with the circuitry of the source node, the data frame including the soft decision forward error correction data field.

In one embodiment, the additional data may comprise one or more of the following: automatic protection switching bytes conforming to ITU-T recommendation G.873.1; network control communication information; line module discovery information; user communication information; Operation information, Administration information, and/or Maintenance information conforming to ITU-T recommendation G.872; port mapping information comprising data matching ingress ports in the source node to egress ports in a destination node to which the data frame is transmitted and/or switching data comprising information for switching egress ports in the destination node.

The at least one optical carrier may be at least one super-channel comprising at least one optical channel containing a plurality of optical carriers. The SD-FEC data fields for each optical carrier may be provisioned together as one overhead communication channel and/or the SD-FEC data fields for more than one optical carrier may be provisioned as separate communication channels.

In one embodiment, the method may also comprise receiving, with circuitry of a second node in the communication network, the second node being a destination node in a path through the network, the at least one optical carrier containing the SD-FEC data field including the first and second data; and decoding, with the circuitry of a second node, at least the second data from the at least one optical carrier, the second data being accessible without accessing client data traffic.

In one embodiment, a method in accordance with the present disclosure may include the steps of detecting, by circuitry of a source node in a communication network, a failure of at least one working path between the source node and a destination node in the network, wherein the at least one working path carries data traffic in at least one optical carrier from the source node to the destination node in the network using at least one network resource when there is no failure in the working path; switching, with circuitry of the source node, the data traffic on at least one optical carrier to a protection path through the network to the destination node, the protection path using at least one network resource different than the network resource used by the working path; modulating, with circuitry of the source node, at least one optical carrier to carry data utilizing a format of a soft decision forward error correction (SD-FEC) data field of an overhead portion of a data frame; encoding, with the circuitry of the source node, into the SD-FEC data field, first data being SD-FEC data and second data being additional data including automatic protection switching bytes conforming to ITU-T recommendation G.873.1; and transmitting across the protection path, with the circuitry of the source node, the data frame including the SD-FEC data field wherein the additional data including automatic protection switching bytes contain information indicative of the working path failure and instructions to the destination node to select data traffic from the protection path.

In one embodiment, the method the circuitry of the source node may comprise at least two line modules, and the step of detecting the failure of at least one working path may be detecting the failure of two or more working paths, the method further comprising the step of determining, with the circuitry of the source node, the line module with the greatest priority; and wherein the step of switching further comprises switching, with circuitry of the source node, the data traffic on at least one optical carrier, from at least the line module with the greatest priority, to a protection path through the network to the destination node.

In one embodiment, the method may further comprise the steps of receiving, by circuitry of the destination node, the data frame including the SD-FEC data field wherein the additional data including automatic protection switching bytes contain information indicative of the working path failure and instructions to the destination node to select data traffic from the protection path; decoding, by circuitry of the destination node, the data frame; and selecting, by circuitry of the destination node, data traffic from the protection path.

In one embodiment, the method may further comprise the steps of modulating, with circuitry of the destination node, at least one optical carrier to carry data utilizing a format of a SD-FEC data field of an overhead portion of a data frame; encoding, with the circuitry of the destination node, into the SD-FEC data field, first data being SD-FEC data and second data being additional data including automatic protection switching bytes conforming to ITU-T recommendation G.873.1 indicative of confirmation of the destination node switching data traffic to the protection path; and transmitting across the protection path, with the circuitry of the destination node, the data frame including the SD-FEC data field wherein the additional data including automatic protection switching bytes contain information indicative of confirmation of the destination node switching data traffic to the protection path.

In one embodiment, the method may further comprise the steps of detecting, by circuitry of the source node, clearance of the failure of the working path between the source node and a destination node in the network; switching, with circuitry of the source node, the data traffic on at least one optical carrier from the protection path to the working path; modulating, with circuitry of the source node, at least one optical carrier to carry data utilizing a format of a SD-FEC data field of an overhead portion of a data frame; encoding, with the circuitry of the source node, into the SD-FEC data field, first data being SD-FEC data and second data being additional data including automatic protection switching bytes conforming to ITU-T recommendation G.873.1; and transmitting across the protection path, with the circuitry of the source node, the data frame including the SD-FEC field wherein the additional data including automatic protection switching bytes contain information indicative of the switch from the protection path to the working path and instructions to the destination node to select data traffic from the working path.

In one embodiment, a method may comprise the steps of mapping, with a central controller having a processor, data traffic from at least one entry port in a first node in a communication network through at least one optical carrier on a path through the network to at least one exit port in a second node in the network, the optical carrier having a corresponding optical wavelength and being modulated to carry the data traffic, the optical wavelength further modulated to carry overhead data utilizing a format of a soft decision forward error correction (SD-FEC) data field of an overhead portion of a data frame; encoding, with circuitry of the first node, SD-FEC data and additional data into the SD-FEC data field, the additional data comprising mapping information for the data traffic; and transmitting, with the circuitry of the first node, the additional data on the optical carrier through the network to the second node.

The method may further comprise the steps of decoding, with circuitry of the second node, the additional data; and switching, with circuitry of the second node, the data traffic based on the additional data.

DEFINITIONS

If used throughout the description and the drawings, the following short terms have the following meanings unless otherwise stated:

APS stands for Automatic Protection Switching.
FEC stands for Forward Error Correction.
GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

Generalized Multiprotocol Label Switching includes multiple types of label switched paths including protection and recovery mechanisms which specifies predefined (1) working connections within a mesh network having multiple nodes and communication links for transmitting data between a headend node and a tailend node; and (2) protecting connections specifying a different group of nodes and/or communication links for transmitting data between the headend node to the tailend node in the event that one or more of the working connections fail. Working connections may also be referred to as working paths, work paths, and/or work connections. Protecting connections may also be referred to as recovery paths, protecting paths, protect paths, protect connections, and/or protection paths. A first node of a path may be referred to as a headend node or a source node. A last node of a path may be referred to as a tailend node or end node or destination node. The headend node or tailend node initially selects to receive data over the working connection (such as an optical channel data unit label switched path) and then, when a working connection fails, the headend node or tailend node selects a protecting connection for passing data within the mesh network. The set up and turn up of the protecting connections may be referred to as restoration or protection. Protection mechanisms, where network resources act as backup for working connections, have been in use for some time.

IETF stands for Internet Engineering Task Force. The Internet Engineering Task Force (IETF) is a volunteer group dedicated to improving the Internet by proposing uniform standards for data transfer protocols, among other things. The IETF has recently extended GMPLS to allow for the transmission of data through an Optical Transport Network (OTN). The IETF publishes Requests for Comment (RFC) detailing proposed standard protocols.

IP stands for Internet Protocol which is a protocol used for communicating data across a packet-switched internetwork using the Internet Protocol Suite, also referred to as TCP/IP.

LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OAM stands for Operation, Administration and Maintenance. Examples of OAM functions include continuity, connectivity and signal quality supervision.

OTN stands for Optical Transport Network which includes a set of optical switch nodes which are connected by optical fiber links. ITU-T recommendations G.709 and G.872 define OTN interface requirements and network architecture respectively.

SCh stands for Super Channel. Super-Channels carry data using optical carriers which occupy bands within the optical spectrum. A Super-Channel (SCh) is provisioned in an Optical Transport Network as one or more optical channel. That is, although the Super-Channel is a composite of multiple optical channels which may be comprised of a plurality of optical carriers, collectively, the optical carriers within a super-channel are routed together through the Optical Transport Network and the Super-Channel is managed and controlled in the Optical Transport Network as though it included only one optical channel or carrier at one wavelength. In reality, each Super-Channel can have multiple wavelengths. In other words, a Super-Channel is a collection of one or more frequency slots to be treated as a unified entity for management and control plane purposes. The Super-Channels can be realized by combining several optical carriers together.

A Frequency Slot is a range of frequency allocated to a given channel and unavailable to other channels within the same flexible grid. A frequency slot is a contiguous portion of the spectrum available for an optical passband filter. A frequency slot is defined by its nominal central frequency and its slot width. A frequency slot is further defined in the International Telecommunications Union Recommendation ITU-T G.694.1, "Spectral grids for WDM applications: DWDM frequency grid".

A contiguous spectrum Super-Channel is a Super-Channel with a single frequency slot. A split-spectrum Super-Channel is a Super-Channel with multiple non-contiguous frequency slots.

SD-FEC stands for Soft Decision Forward Error Correction.

Shared Mesh Protection (SMP) is a common protection and recovery mechanism in mesh networks, where multiple paths can share the same set of network resources (such as bandwidth or timeslots) for protection purposes. Mesh networks utilizing Shared Mesh Protection may be referred to as shared mesh networks.

TE stands for Traffic Engineering which is a technology that is concerned with performance optimization of operational networks. In general, TE includes a set of applications mechanisms, tools, and scientific principles that allow for measuring, modeling, characterizing and control of user data traffic in order to achieve specific performance objectives.

WSS stands for Wavelength Selective Switch which is a device that may be used to allow selection of data traffic from particular line modules and blocking of data traffic from particular line modules.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise. Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to the drawings, and in particular to FIG. 1, shown therein and designated by reference numeral 30 is a block diagram of an exemplary optical communication network 30. The network 30 may contain a plurality of Network Elements 40 (referred to herein as NE or NEs), which also may be referred to as nodes 40. The NEs 40 may include a source NE 40a and a destination NE 40b, though communication may be bi-directional between the NEs 40. The NEs may include intermediate nodes between the source NE 40a and the destination NE 40b, such as NEs 40c, 40d, 40e and 40f. The NEs 40 are connected by communication links 42. Network 30 may be any type of network that uses light as a transmission medium. For example, network 30 may include a fiber-optic based network, an optical transport network, a light-emitting diode network, a laser diode network, an infrared network, and/or a combination of these or other types of optical networks.

The number of NEs 40 illustrated in FIG. 1 is provided for explanatory purposes. In practice, there may be additional devices and/or networks, fewer devices, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the NEs 40 may perform one or more functions described as being performed by another one or more of the NEs 40.

NEs 40 may include one or more devices that gather, process, store, and/or provide information in a manner described herein. For example, NEs 40 may include one or more optical data processing and/or traffic transfer devices, such as an optical node, an optical add-drop multiplexer ("OADM"), a reconfigurable optical add-drop multiplexer ("ROADM"), an optical multiplexer, an optical demultiplexer, an optical transmitter, and optical receiver, an optical transceiver, a photonic integrated circuit, an integrated optical circuit, a computer, a server, a router, a bridge, a gateway, a modem, a firewall, a switch, a network interface card, a hub, and/or any type of device capable of processing and/or transferring optical traffic. In some implementations, NEs 40 may include OADMs and/or flexible ROADMs and/or flex channel multiplexing modules capable being configured to add, drop, multiplex, and demultiplex optical signals. NEs 40 may process and transmit optical signals to other NEs 40 throughout network 30 in order to deliver optical transmissions. NEs 40 may include line modules 44 (such as line module 44a in NE 40a and line module 44b in NE 40b), advanced optical flex channel modules, and/or advanced optical line modules. NEs 40 may include one or more wavelength selective switch (WSS) 46 (such as WSS 46a in NE 40a and WSS 46b in NE 40b) to block and/or access optical carriers. NEs 40 may include one or more soft-decision forward error correction (SD-FEC) line card.

The NEs 40 are adapted to facilitate the communication of data (which may be referred to herein as "traffic" and/or "data traffic") between multiple NEs 40 in a shared mesh network 30. In accordance with the present disclosure, messages transmitted between the NEs 40 can be processed by circuitry within the NEs 40. Circuitry could be analog and/or digital, components, or one or more suitably programmed microprocessors and associated hardware and software, or hardwired logic. Also, certain portions of the implementations have been described as "circuitry" that perform one or more functions. The term "circuitry," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the circuitry and result in various physical transformations. Circuitry may include one or more processor which may execute instructions that cause the processor to perform the methods described herein. The information produced by the processor may be stored in non-transitory memory.

Exemplary line modules and nodes are described in U.S. Pat. No. 8,223,803 (Application Publication number 20090245289), entitled "Programmable Time Division Multiplexed Switching," the entire contents of which are hereby incorporated herein by reference.

Within the exemplary network 30, a network element 40, such as NE 40a, may act as a source node and may establish a network path with a destination node, such as NE 40b. The source node NE 40a and the destination node may have circuitry comprising one or more Line Module 44a, 44b and one or more wavelength selective switch (WSS) 46a, 46b.

Figure 2:
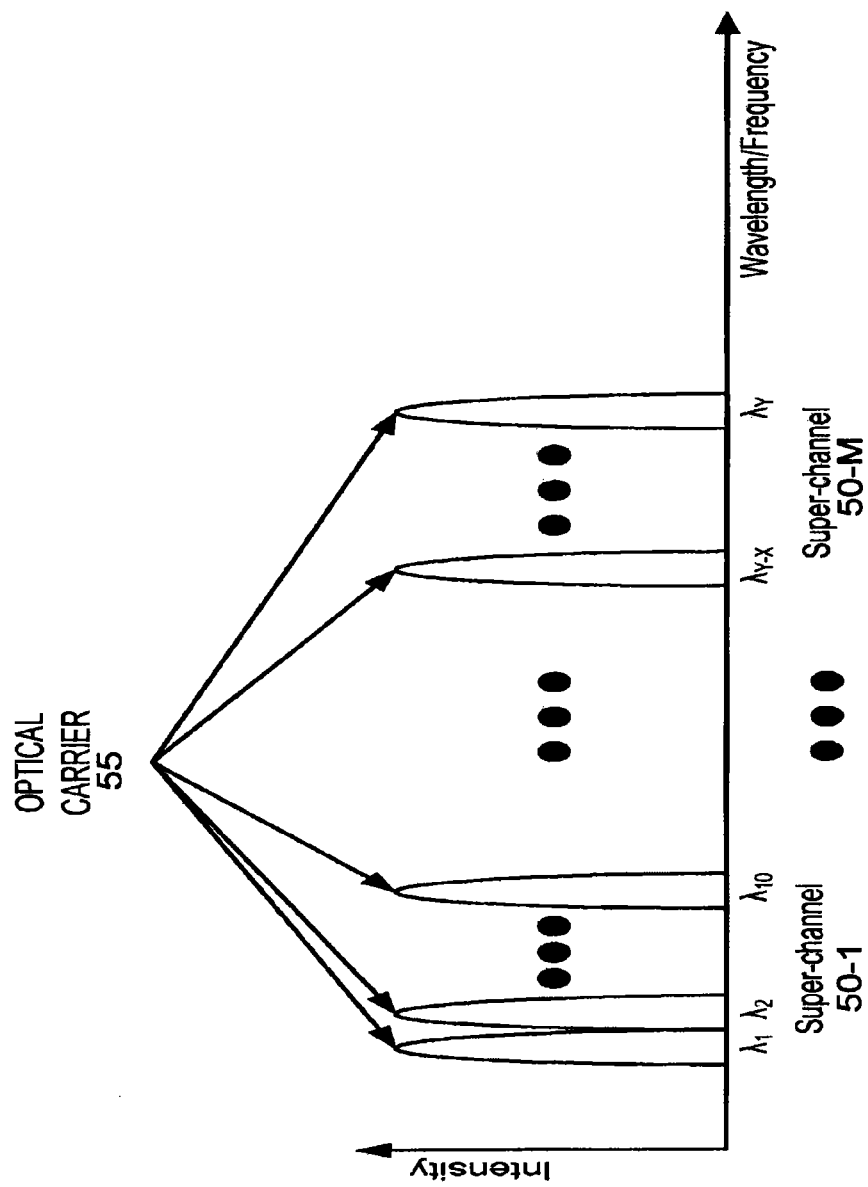
FIG. 2 is an example frequency and/or wavelength spectrum associated with super-channels.

The source node NE 40a may transmit optical signals, also known as optical carriers 55 (as shown in FIG. 2). The optical carriers 55 may be provisioned as a corresponding Super-Channel 50, such as Super-Channels 50a and 50b shown in FIG. 1. A super-channel, as used herein, may refer to multiple optical carriers 55 that are simultaneously transported over the same optical waveguide (e.g., a single mode optical fiber). Each optical carrier 55 included in a super-channel 50 may be associated with a particular optical wavelength. The multiple optical carriers 55 may be combined to create a super-channel using wavelength division multiplexing. For example, the multiple optical carriers 55 may be combined using dense wavelength division multiplexing, in which carrier-to-carrier spacing may be less than 1 nanometer. The optical carriers 55 may be modulated to carry an optical signal. In other words, the Super-Channel 50 may be a composite signal including or made up of a plurality of optical carriers 55, each of which having a corresponding one of a plurality of wavelengths and each being modulated to carry a corresponding one of a plurality of data streams.

The Super-Channel 50a, 50b is managed and controlled in the network 30 as though it included only one optical channel or carrier 55 at one wavelength. As generally understood, provisioning of an optical channel may include designating a path for such optical signal through the network 30.

The source node NE 40a may establish one or more optical channel, such as Super-Channels 50a and 50b, associated with the network path that allows traffic to be transported via the Super-Channels 50a, 50b. The Super-Channels 50a, 50b may permit the traffic to be transmitted, via the network path, at a high collective data rate, for example, greater than or equal to one terabits per second (Tbps), greater than two Tbps, greater than five Tbps, etc.

An example frequency and/or wavelength spectrum associated with Super-Channels 50 is illustrated in FIG. 2. In some implementations, the frequency and/or wavelength spectrum may be associated with a particular optical spectrum (e.g., C Band, C+ Band, etc.). As illustrated, super-channel 50-1 may include multiple optical carriers 55, each of which corresponds to a wavelength λ (e.g., λ1, λ2, through λ10) within a first wavelength band. Similarly, super-channel 50-M may include multiple optical carriers 55, each of which corresponds to a wavelength λ (e.g., λY-X through λY) within a second wavelength band. The quantity of illustrated optical carriers 55 per super-channel 50 is provided for explanatory purposes. In practice, super-channel 50 may include any quantity of optical carriers 55.

Optical carrier 55 may be associated with a particular frequency and/or wavelength of light. In some implementations, optical carrier 55 may be associated with a frequency and/or wavelength at which the intensity of light carried by optical carrier 55 is strongest (e.g., a peak intensity, illustrated by the peaks on each optical carrier 55). In some implementations, optical carrier 55 may be associated with a set of frequencies and/or a set of wavelengths centered at a central frequency and/or wavelength. The intensity of light at the frequencies and/or wavelengths around the central frequency and/or wavelength may be weaker than the intensity of light at the central frequency and/or wavelength, as illustrated.

In some implementations, the spacing between adjacent wavelengths (e.g., λ1 and λ2) may be equal to or substantially equal to a bandwidth (or bit rate) associated with a data stream carried by optical carrier 55. For example, assume each optical carrier 55 included in super-channel 50-1 (e.g., λ1 through λ10) is associated with a fifty Gigabit per second ("Gbps") data stream. In this example, super-channel 50-1 may have a collective data rate of five hundred Gbps (e.g., 50 Gbps×10). In some implementations, the collective data rate of super-channel 50 may be greater than or equal to one hundred Gbps. Additionally, or alternatively, the spacing between adjacent wavelengths may be non-uniform, and may vary within a particular super-channel band (e.g., super-channel 50-1).

Figure 3:
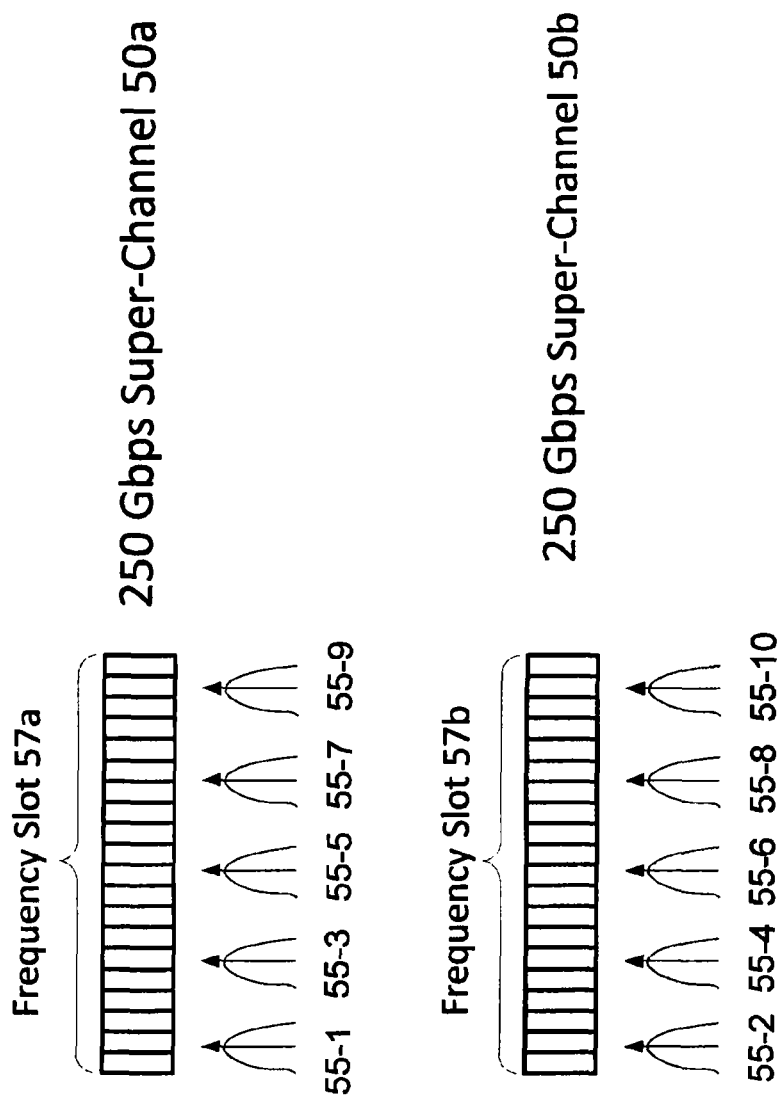
FIG. 3 is another frequency and/or wavelength spectrum associated with super-channels.

As illustrated in FIG. 3, in some implementations, optical carriers 55 included in super-channel 50 may be non-adjacent (e.g., may be associated with non-adjacent wavelengths in an optical spectrum). Such super-channels may be referred to as split-spectrum super-channels. A split-spectrum super-channel is a super-channel with multiple frequency slots. Each frequency slot will be allocated an independent passband filter, irrespective of whether frequency slots are adjacent or not. In the example of FIG. 3, Super-Channel 50a includes frequency slot 57a having optical carriers 55-1, 55-3, 55-5, 55-7, and 55-9, while Super-Channel 50b includes frequency slot 57b having optical carriers 55-2, 55-4, 55-6, 55-8, and 55-10.

Networks, network elements, and super-channels are further described in U.S. patent application Ser. No. 14/041,419, titled "Optical Bandwidth Manager" filed on Sep. 30, 2013, the entire contents of which are hereby expressly incorporated herein by reference.

Returning to FIG. 1, each super-channel 50a, 50b may be provisioned in network 30 as one or more optical channel. Provisioning of an optical channel may include designating an optical route and/or path for the optical channel through network 30. For example, an optical channel may be provisioned to be transmitted via a set of NEs 40. In some implementations, NEs 40 may be configured as a ring. Additionally, or alternatively, NEs 40 may be configured in a point-to-point configuration or mesh configuration. Provisioning may be referred to as "allocating" and/or "allocation" herein. Even though each super-channel 50a, 50b is a composite of multiple optical carriers 55, the optical carriers 55 included in super-channel 50a, 50b may be routed together through optical network 30. Additionally, or alternatively, super-channel 50a, 50b may be managed and/or controlled in optical network 30 as though the super-channel 50a, 50b were one or more optical channels.

Typically, overhead communications are transmitted in optical networks on a separate wavelength than the wavelength carrying user data traffic (also referred to herein as client data traffic). The separate wavelength may be known as an out-of-band channel. One example of an out-of-band control channel is the Optical Supervisory Channel (OSC). However, it may be desirable to communicate overhead data on the same wavelength as the user data traffic (that is, in-band), but in such a way that the overhead data is accessible without necessarily accessing the user data traffic.

This need may be addressed by utilizing unused bits in a soft decision forward error correction (SD-FEC) data field of an overhead portion of a data frame, thereby creating a general purpose, high speed, long reach, client payload agnostic, bi-directional, in-band communication system. Encoders currently have up to 128 spare bits in the SD-FEC data field, which yields up to 128 Mbps per 50 G wave, and up to 1.28 Gbps per super-channel with ten carriers. Of course, it will be understood that this rate would increase as per wave data rates increase beyond 50 G.

Figure 4A:
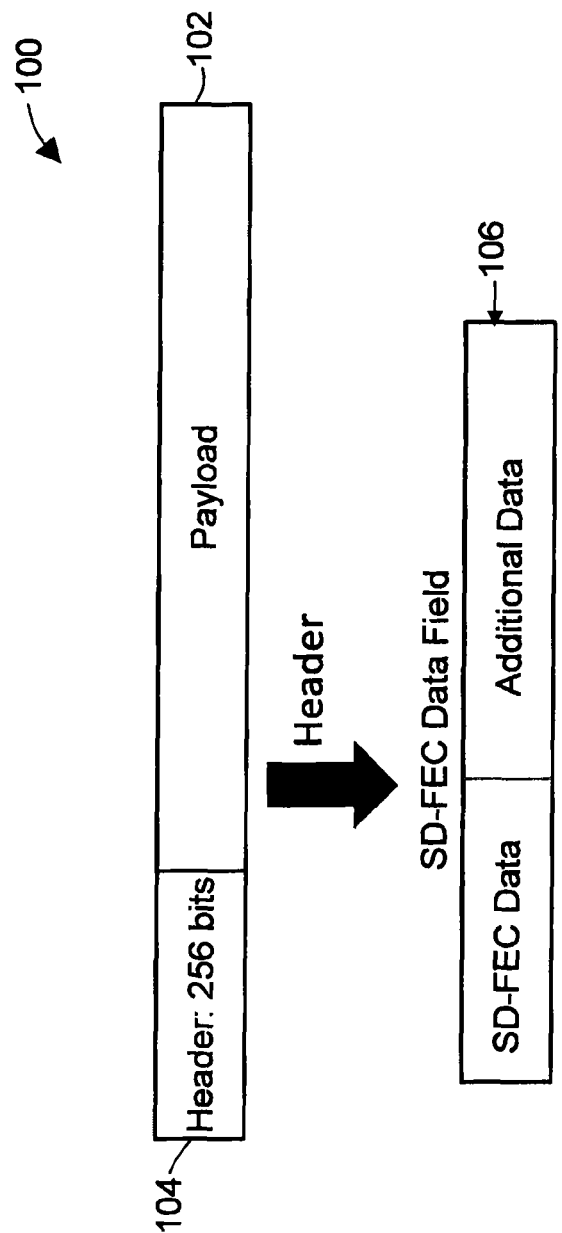
FIG. 4A is a diagram of an exemplary data frame in accordance with the present disclosure.

FIG. 4A is a diagram of an exemplary data frame 100 in accordance with the present disclosure. As illustrated in FIG. 4A, in one implementation, circuitry of a source node, such as NE 40a in the network 30 is used to modulate at least one optical carrier 55 to carry data utilizing the format of data frame 100. Data frame 100 typically comprises a payload portion 102 for carrying user data traffic and an overhead portion 104 (also known as a header) as is well known by those having skill in the art. The overhead portion 104 contains SD-FEC data field 106. Circuitry of the NE 40a may encode data into the payload portion 102 and overhead portion 104 of data frame 100.

The SD-FEC data field 106 may be encoded with SD-FEC data 107 and additional data 108. The additional data 108 may be any communication information such that may be desirable to be accessible without accessing the user data traffic. The SD-FEC data field 106 may be carried in each wavelength transmitted through the network 30.

For example, returning now to FIG. 1, in the exemplary network 30, NE 40a provisions a 250 Gbps super-channel 50a comprising optical carriers 55-1, 55-3, 55-5, 55-7, and 55-9 (as shown in FIG. 3). NE 40a may modulate each optical carrier in the super-channel 50a to carry data utilizing the format of data frame 100 as described in conjunction with FIG. 4. NE 40a may encode data in the SD-FEC data field 106 of each optical carrier 55-1, 55-3, 55-5, 55-7, and 55-9. NE 40a may provision another 250 Gbps super-channel 50b comprising optical carriers 55-2, 55-4, 55-6, 55-8, and 55-10.

The source node, such as NE 40a, may transmit, with the circuitry of the NE 40a, the data frame 100 including the SD-FEC data field 106. The destination node NE 40b may receive the data frame 100 and decode the SD-FEC data field 106 without having to decode the user data traffic in the payload portion 102 of the data frame 100. The NEs 40 may provision the SD-FEC data fields 106 for two or more individual optical carriers 55 together as one overhead communication channel. That is, the NEs 40 may aggregate the data from multiple SD-FEC data fields 106. Additionally, or alternatively, the NEs 40 may provision one or more individual optical carriers 55 separately, such that the NEs 40 utilize the data in one or more SD-FEC data field 106 as a stand-alone communication.

Figure 4B:
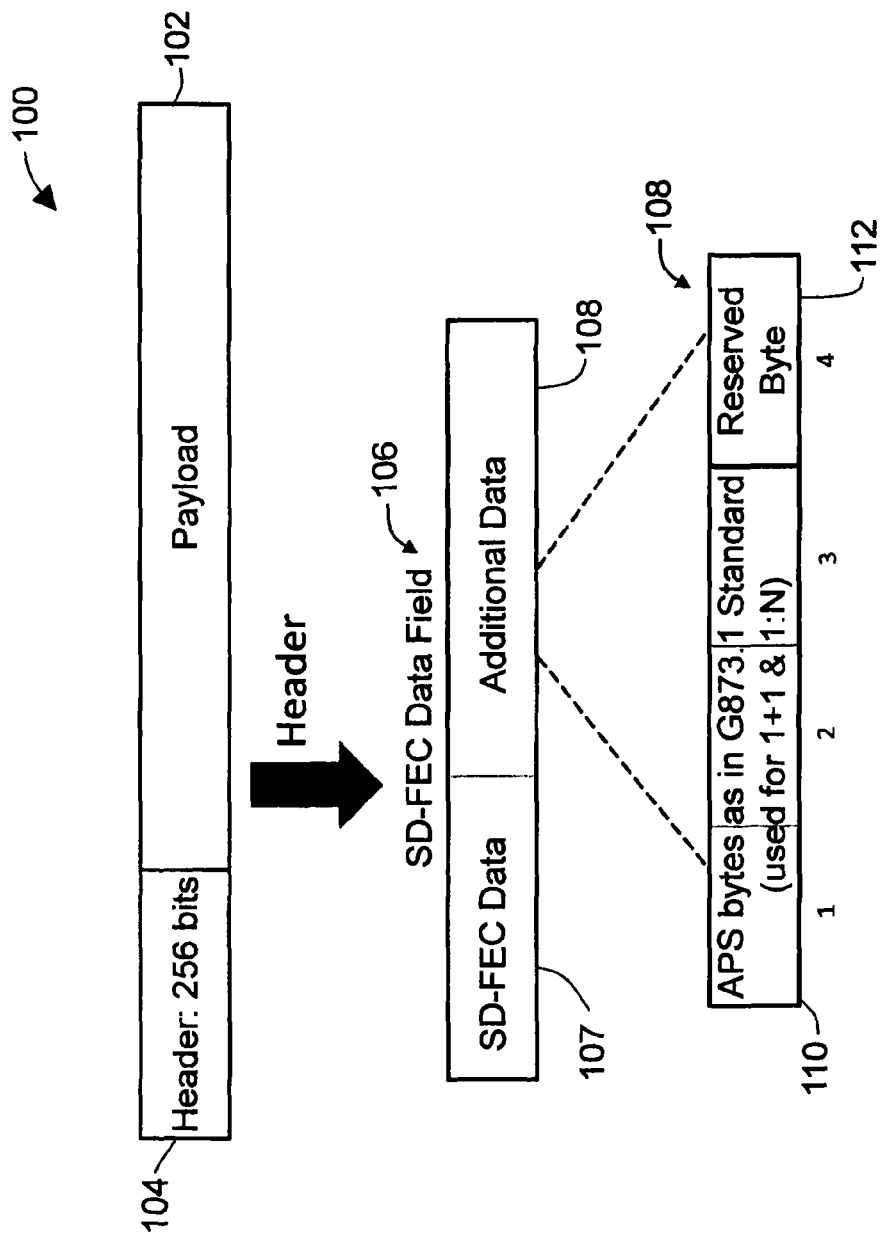
FIG. 4B is a diagram of an exemplary implementation of the exemplary data frame of FIG. 4A in accordance with the present disclosure.

FIG. 4B is a diagram of the exemplary data frame 100 of FIG. 4A illustrating one example of SD-FEC Data Field 106 usage. In one implementation, the SD-FEC Data Field 106 contains SD-FEC Data 107 and additional data 108, where the additional data 108 in the SD-FEC field 106 comprises automatic protection switching (APS) bytes 110 conforming to ITU-T recommendation G.873.1. The additional data 108 in the SD-FEC field 106 may also comprise one or more reserved byte 112. The APS bytes 110 may be utilized for protection and recovery mechanisms. Though FIG. 4B shows the APS bytes 110 in a particular portion of the SD-FEC data field 106, the APS bytes 110 may be located in any portion of the SD-FEC data field 106 not dedicated to SD-FEC data 107.

Figure 5:
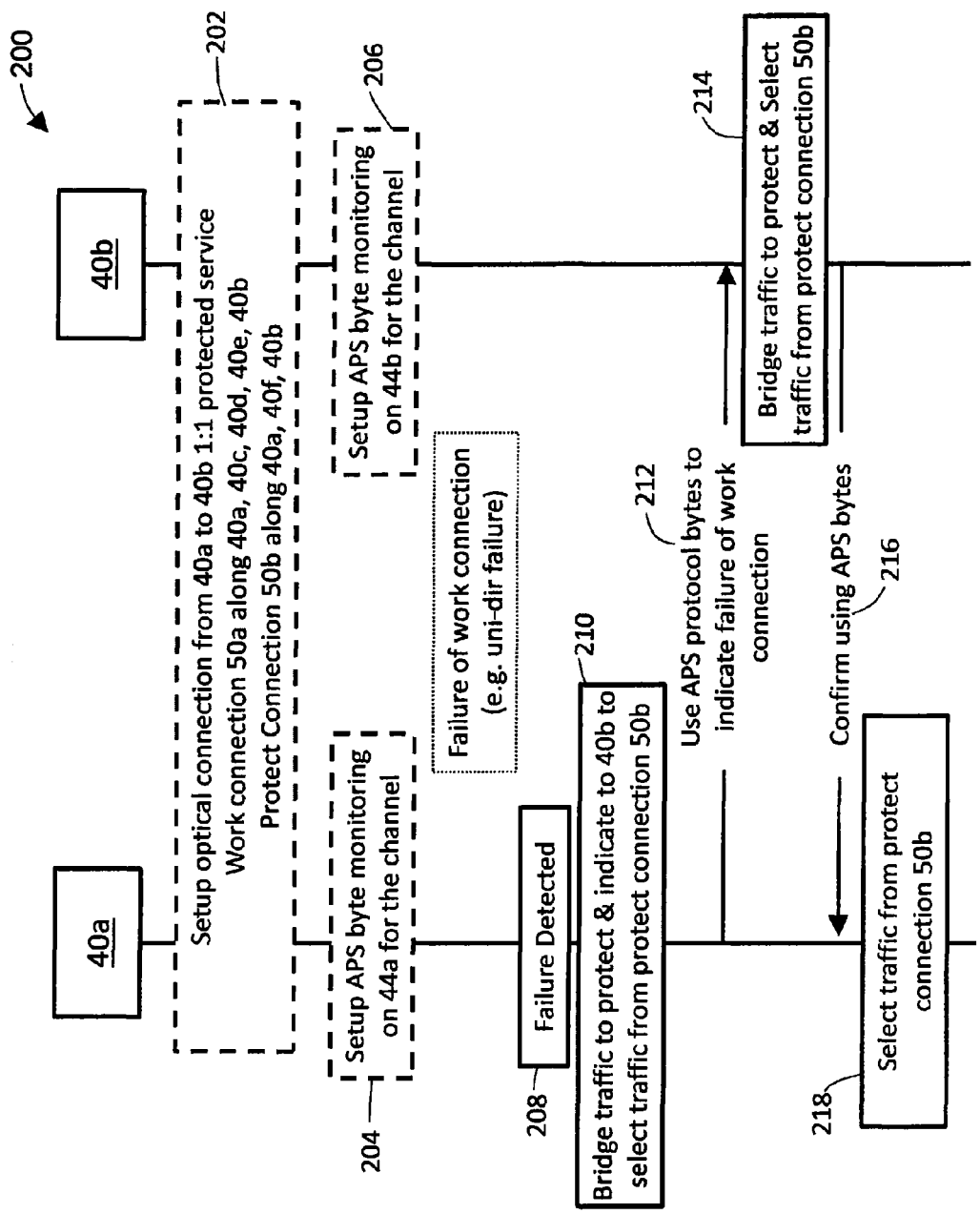
FIG. 5 is an exemplary process diagram of a protection and recovery mechanism in accordance with the present disclosure.

FIG. 5 is a diagram of an exemplary process 200 of a 1:1 protection and recovery of the network 30 of FIG. 1 utilizing APS bytes 110 encoded in the SD-FEC data field 106 in the overhead portion 104 of data frame 100 carried in modulated optical carriers 55. In step 202 of FIG. 5, and as illustrated in FIG. 1, an optical connection is initially set up as a working path (that is, a path that carries data through the network 30 when there is no failure in the path) from NE 40a through NE 40c, NE 40d, and 40e to NE 40b through the network 30. Similarly, an optical connection may be set up as a protect path (that is, a back-up path) from NE 40a through NE 40f to NE 40b through the network 30. In the example of FIG. 1, Super-Channel 50a is the working path, and Super-Channel 50b is the protect path.

In steps 204 and 206, the source node NE 40a and the destination node NE 40b setup APS byte monitoring on Line Module 44a and 44b (respectively) for the working path, Super-Channel 50a. The source node NE 40a may transmit data utilizing Super-Channel 50a. In the event of a failure (designated by "X" in FIG. 1) in the working path, Super-Channel 50a, the NE 40a detects the failure by mechanisms known to those in the art (step 208). NE 40a may utilize circuitry in NE 40a to bridge data traffic onto Super-Channel 50b and to indicate to the destination node NE 40b to start selecting data traffic from the protect path Super-Channel 50b, as shown in step 210.

In step 212, NE 40a encodes APS bytes 110, conforming to ITU-T recommendation G.873.1, in the SD-FEC data field 106 in the data frame 100 of one or more of the optical carriers of Super-Channel 50b comprising the information indicative to NE 40b to select the data traffic from the protect path Super-Channel 50b. NE 40a then transmits the data frame 100 to the destination node NE 40b.

In step 214, the destination node NE 40b bridges and selects the data traffic to and from the protect path Super-Channel 50b. In step 216, the destination node NE 40b confirms the switch to the protect path Super-Channel 50b. The destination node NE 40b modulates the optical carriers 55 to carry data and encodes the APS bytes 110 with data indicative of the confirmation, and then transmits the data frame 100 to NE 40a. NE 40a may then select traffic from the protect path Super-Channel 50b, as shown in step 218.

Figure 6:
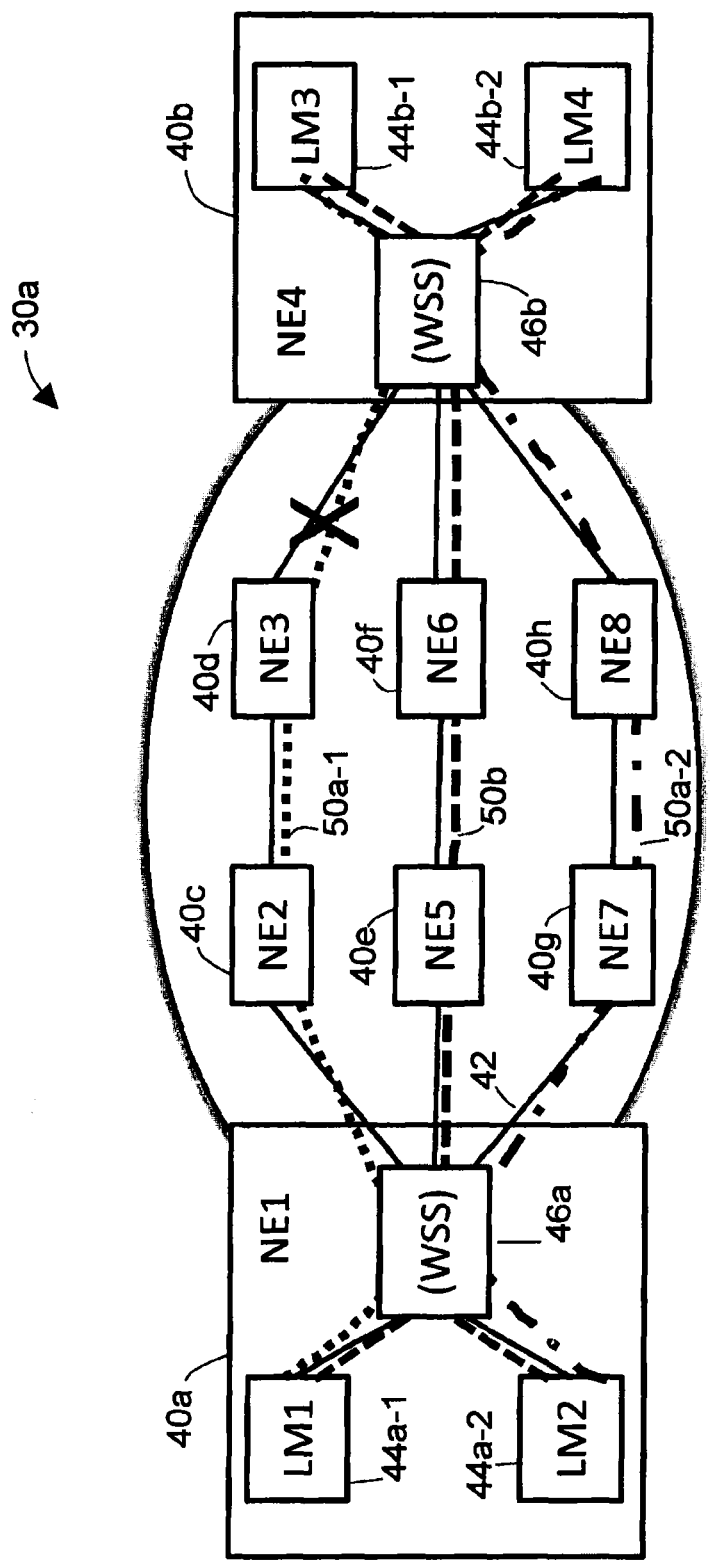
FIG. 6 is a schematic diagram of another exemplary optical communication network.

FIG. 6 is a block diagram of another exemplary optical network 30a in which APS bytes 110 may be used for protection and recovery mechanisms in accordance the present disclosure. FIG. 6 illustrates a 1:N type protection and recovery mechanism. Network 30a comprises NEs 40a through 40h. NE 40a comprises at least Line Module 44a-1, Line Module 44a-2, and WSS 46a. NE 40b comprises Line Module 44b-1, Line Module 44b-2, and WSS 46b. In network 30a, NE 40a is a source node, NE 40b is a destination node, and NEs 40c through 40h are intermediate nodes. The Line Modules 44a-1, 44a-2, 44b-1, and 44b-2 are tuned for split-spectrum Super-Channel 50a and 50b.

Figure 7A:
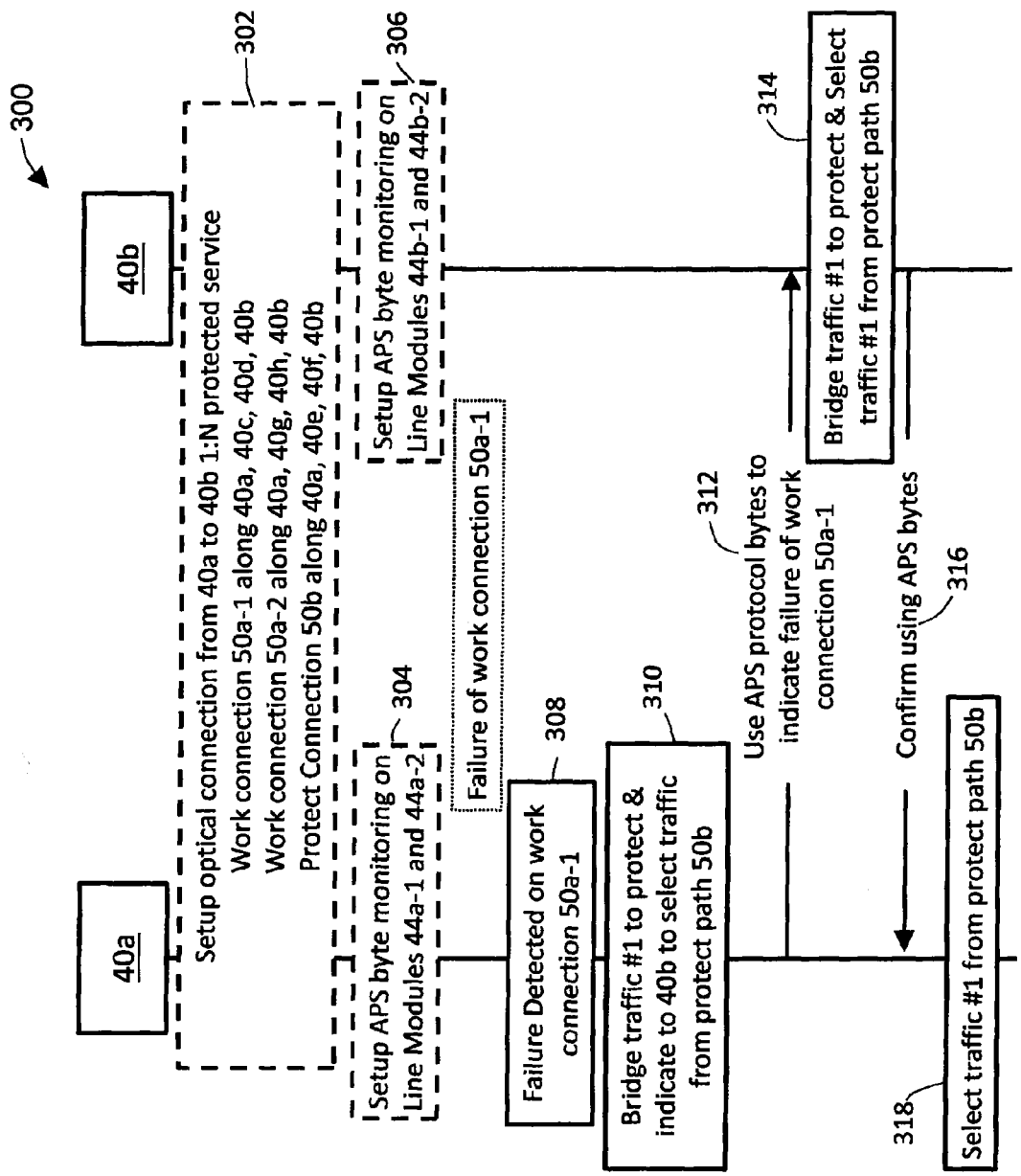
FIG. 7A is an exemplary process diagram of another protection and recovery mechanism in accordance with the present disclosure.
Figure 7B:
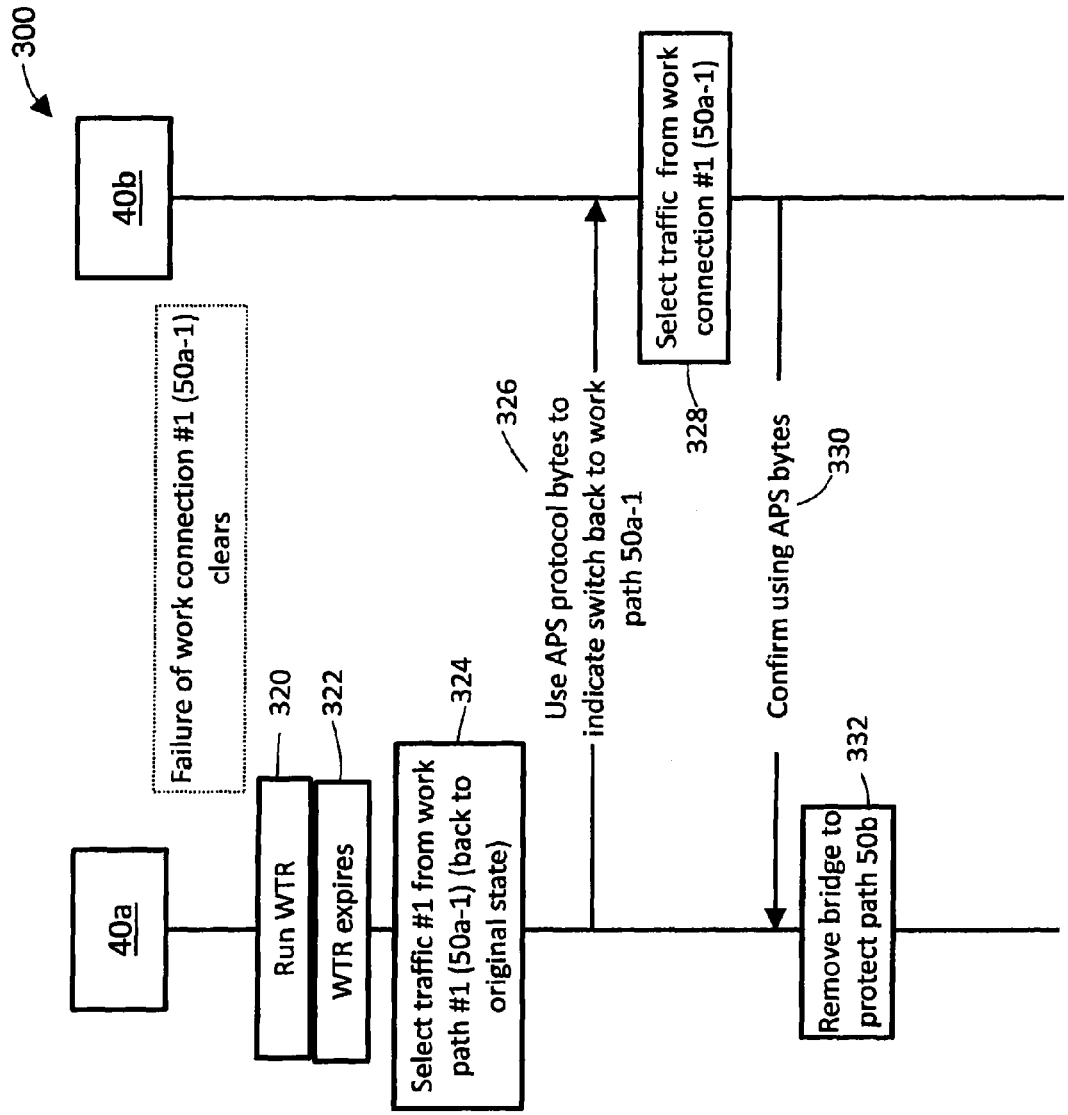
FIG. 7B is a continuation of the exemplary process diagram of FIG. 7A.

FIGS. 7A and 7B are block diagrams of an exemplary process 300 of a 1:N protection and recovery of the network 30a of FIG. 6 utilizing APS bytes 110 encoded in the additional data 108 in the SD-FEC data field 106 of the overhead portion 104 of data frame 100 carried in modulated optical carriers 55. In step 302 of FIG. 7A and as illustrated in FIG. 6, an optical connection is initially set up as a first working path 50a-1 (that is, a path that carries data through the network 30a when there is no failure in the path) from Line Module 44a-1 through WSS 46a of NE 40a through NE 40c and NE 40d through WSS 46b to Line Module 44b-1 of NE 40b. Additionally, an optical connection is set up as a second working path 50a-2 from the Line Module 44a-2 through WSS 46a of NE 40a through NE 40g and NE 40h to WSS 46b to Line Module 44b-2 of NE 40b. The first and second working path 50a-1, 50a-2 are Super-Channel 50a, having optical carriers 55-1, 55-3, 55-5, 55-7, and 55-9 as illustrated in FIG. 3.

Similarly, an optical connection may be set up as a shared protect path (that is, a back-up path for the first and second working path) from NE 40a through NE 40e and 40f to NE 40b through the network 30a. The protect path in this example corresponds to split spectrum Super-Channel 50b, having optical carriers 55-2, 55-4, 55-6, 55-8, and 55-10 as illustrated in FIG. 3. Initially, WSS 46a and WSS 46b block the carriers 55-2, 55-4, 55-6, 55-8, and 55-10 of Super-Channel 50b coming from Line Modules 44a-2 and 44b-2, while the Line Modules 44a-1 and 44b-1 are used for APS coordination.

In steps 304 and 306, the source node NE 40a and the destination node NE 40b set up APS byte monitoring on Line Modules 44a-1, 44a-2 and Line Modules 44b-1, 44b-2 (respectively) for the first and second working paths, Super-Channel 50a-1, 50a-2, and the source node NE 40a may transmit data utilizing Super-Channel 50a-1, 50a-2. In the event of a failure (designated by "X" in FIG. 6) in the first working path Super-Channel 50a-1, the NE 40a and/or NE 40b detects the failure on the first working path 50a-1 by mechanisms known to those in the art, in step 308. In step 310, NE 40a may utilize circuitry to bridge data traffic onto protect path Super-Channel 50b and to indicate to the destination node NE 40b to start selecting data traffic from the protect path Super-Channel 50b for connection 50a-1.

In step 312, NE 40a encodes APS bytes 110, conforming to ITU-T recommendation G.873.1, as additional data 108 in the SD-FEC data field 106 in the data frame 100 of one or more of the optical carriers 55 of Super-Channel 50b comprising the information indicative to NE 40b to select the data traffic from the protect path Super-Channel 50b, for connection 50a-1. NE 40a then transmits the data frame 100 to the destination node NE 40b.

In step 314, the destination node NE 40b bridges and selects the data traffic from 50a-1 to and from the protect path Super-Channel 50b. In step 316, the destination node NE 40b confirms the switching of connection 50a-1 to the protect path, Super-Channel 50b, for connection 50a-1. The destination node NE 40b modulates the optical carriers 55 to carry data and encodes the APS bytes 110 with data indicative of the confirmation, and then transmits the data frame 100 to NE 40a, in step 316. NE 40a may then select 50a-1 traffic from the protect path, Super-Channel 50b, as shown in step 318.

As shown in FIG. 7B, NE 40a may detect clearance of the failure of the first working path 50a-1. In step 320, the source node NE 40a may run wait-to-restore (WTR), and wait until WTR expires in step 322. NE 40a may switch and select traffic from the first working path 50a-1, in step 324, that is, returning the network 30a to the configuration before the failure. In step 326, NE 40a may utilize APS bytes 110 in the additional data 108 of the SD-FEC data field 106 to encode data in one or more modulated optical carrier 55, the data indicative of the switch back to the first working path 50a-1 to the destination node NE 40b. In step 328, NE 40b may decode the data frame 100 and may select traffic from working path 50a-1. In step 330, NE 40b may utilize APS bytes 110 in the additional data 108 of the SD-FEC data field 106 to encode data in one or more modulated optical carrier 55, the data indicative of confirmation of the switch to NE 40a. In step 332, NE 40a may remove the bridge of 50a-1 traffic to the protect path 50b.

The NEs 40a and 40b may provision the SD-FEC data fields 106 to utilize the data in multiple SD-FEC fields 106 as aggregate data (that act as one overhead communication channel), or the NEs 40a and 40b may provision SD-FEC data fields 106 individually (that act as separate overhead communication channels).

Figure 8:
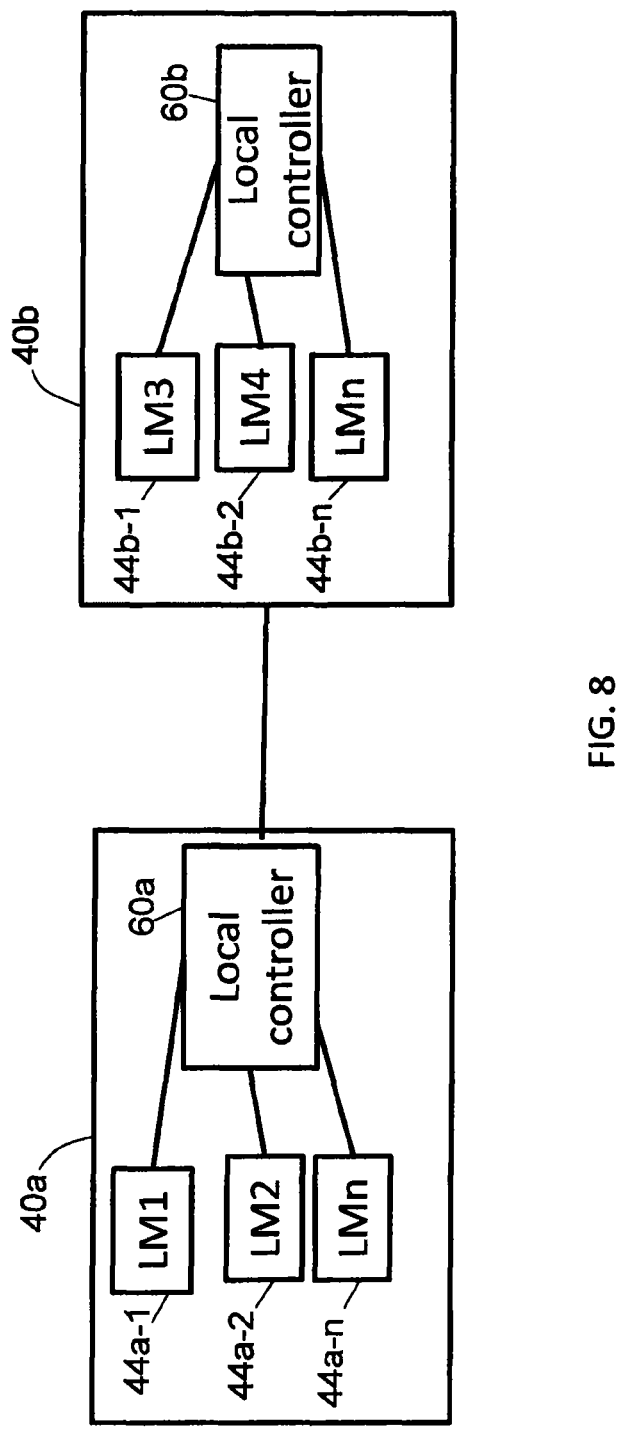
FIG. 8 is a schematic diagram of exemplary network elements in accordance with the present disclosure.

FIG. 8 is a block diagram of one implementation of the source and destination nodes, NEs 40a and 40b. In the example illustrated, NEs 40a and 40b, have a local controller 60 (such as a processor) that coordinates internally to the NEs 40a, 40b to decide which Line Module(s) 44 may use APS bytes 110. NE 40a may have any number of Line Modules 44a-1, 44a-2, . . . 44a-n. NE 40b may have any number of Line Modules 44b-1, 44b-2, . . . 44b-n. The coordination may happen between software subsystems running on the Line Modules 44. For example, the controller 60 may coordinate use of the APS bytes 110 when multiple working paths fail simultaneously. The Line Modules 44 may be assigned priorities, then in the case of multiple working path failures, the controller allows the Line Module 44 with the highest priority to use the APS bytes 110. The priority may be configured locally at both the source node NE 40a and the destination node NE 40b.

Figure 9:
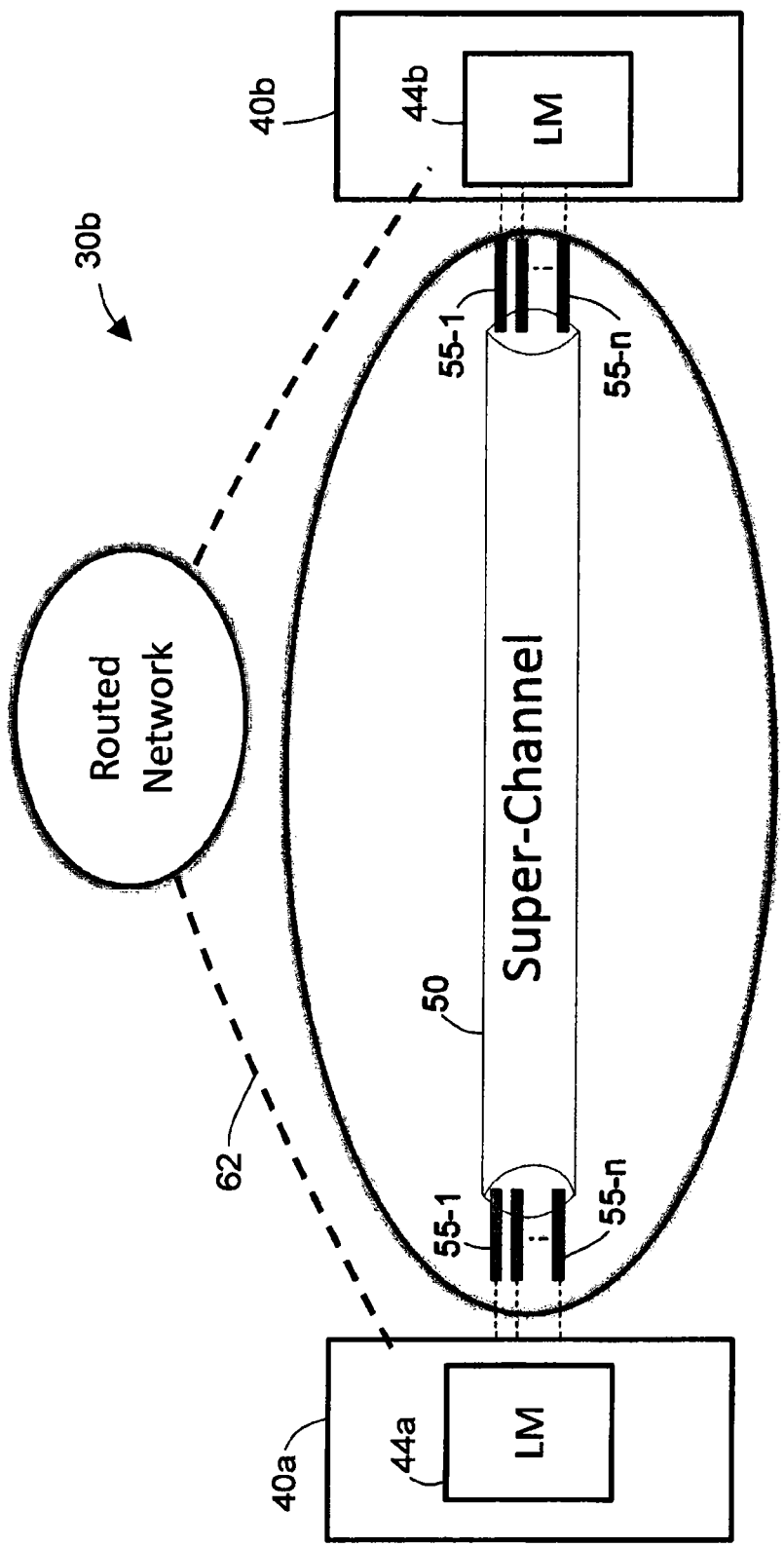
FIG. 9 is a schematic diagram of yet another exemplary optical communication network.

In one implementation of the additional data encoded in the SD-FEC data field 106, the additional data 108 may comprise network control communication information. For example, FIG. 9 is a block diagram of a network 30b comprising source node NE 40a having Line Module 44a, Super-Channel 50 having multiple optical carriers 55-1 . . . 55-n, and destination node NE 40b having Line Module 44b. The optical carriers 55 may be modulated to carry the encoded additional data in the SD-FEC data field 106 in-band with the wavelength of individual optical carrier 55. Utilizing the SD-FEC data field 106 for the additional data 108 allows control channel functionality with the additional data 108, even in optical connection applications that do not have an out-of-band control channel 62 (such as OSC) available. For example, Line Module 44 operation in Subsea Line Terminating Equipment (SLTE) mode or Open Wave. One example of a system in which OSC is not available is Optical fibre submarine cable systems, which are further described in Rec. ITU-T G.972 (September 2011), "Definition of terms relevant to optical fibre submarine cable systems." Of course, the additional data 108 in the SD-FEC data field 106 may also be used in networks that have an out-of-band control channel 62 to provide redundant in-band control channel functionality.

Figure 10:
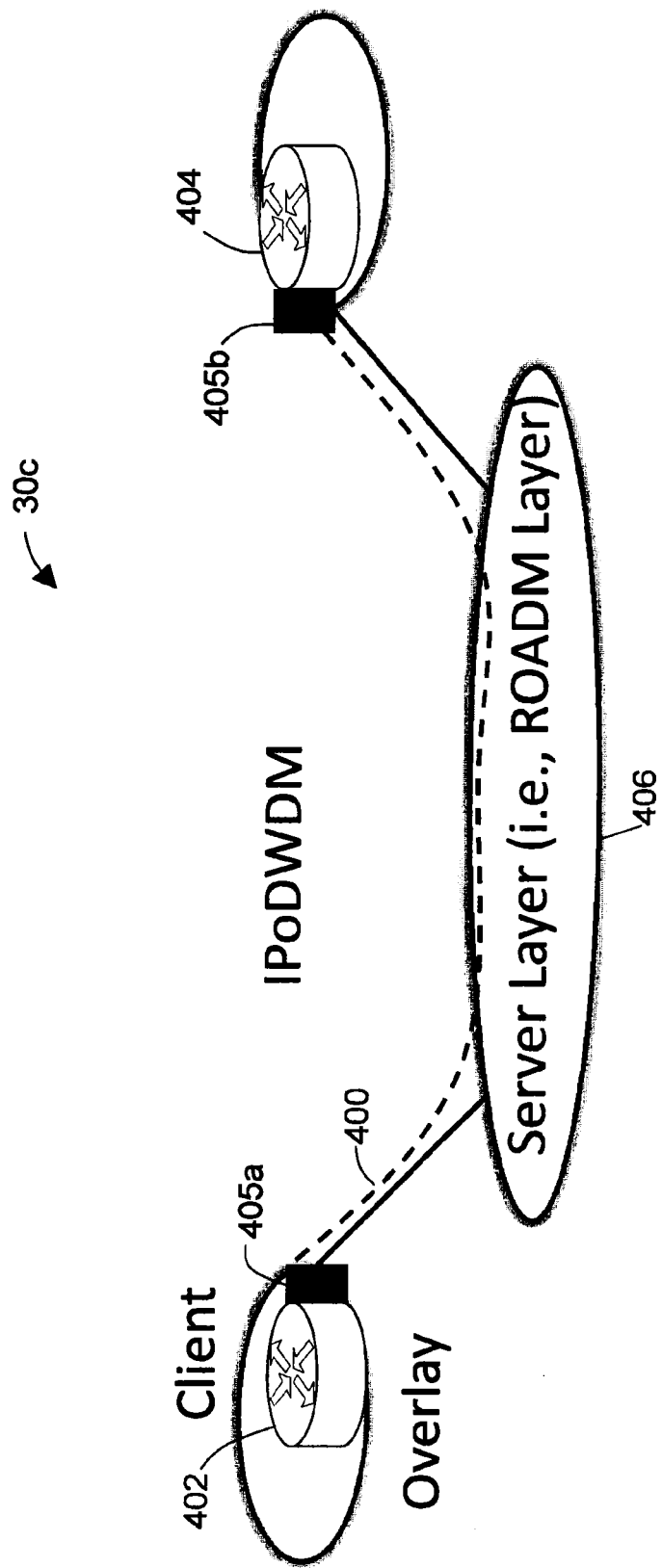
FIG. 10 is a schematic diagram of yet another exemplary optical communication network

FIG. 10 is a block diagram of another exemplary network 30c utilizing the additional data 108 in the SD-FEC data field 106, in which the additional data 108 comprise network control communication information. In network 30c, the additional data 108 encoded in the SD-FEC data field 106 allows an in-band control channel 400 functionality between client routers 402 and 404 having transponders 405a, 405b through a server layer 406 (i.e. ROADM layer) in an IPoDWDM environment. The additional data 108 may comprise user communication information.

Figure 11:
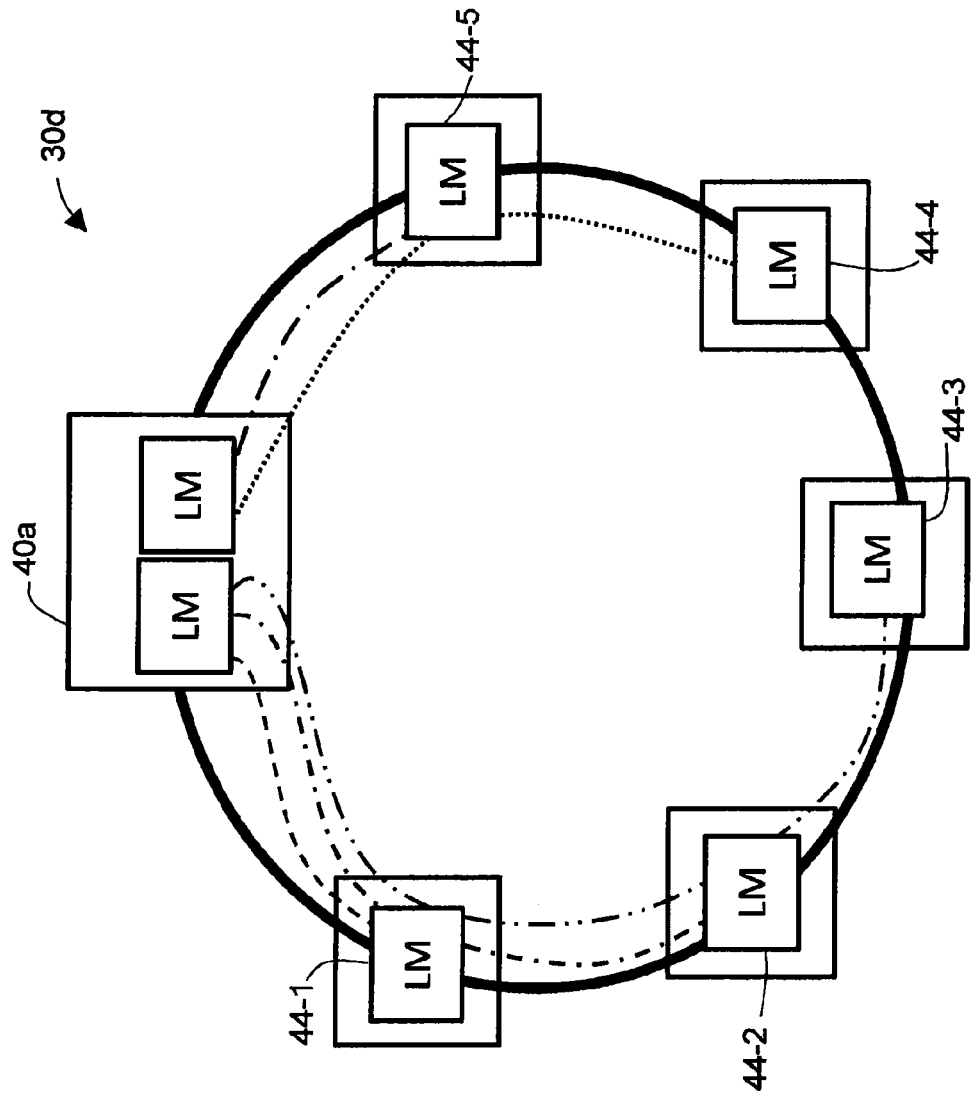
FIG. 11 is a schematic diagram of yet another exemplary optical communication network.

FIG. 11 is a block diagram of an exemplary network 30d utilizing the additional data 108. In network 30d, the source node NE 40a utilizes encoded additional data 108 in the SD-FEC data field 106 to auto-discover Line Modules 44-1, 44-2, . . . 44-n in the network 30d. NE 40a may also utilize the additional data for Operation, Administration, and/or Maintenance (OAM) functionality, as defined in ITU-T recommendation G.709 and G798.1, including automatic neighbor discovery.

Figure 12A:
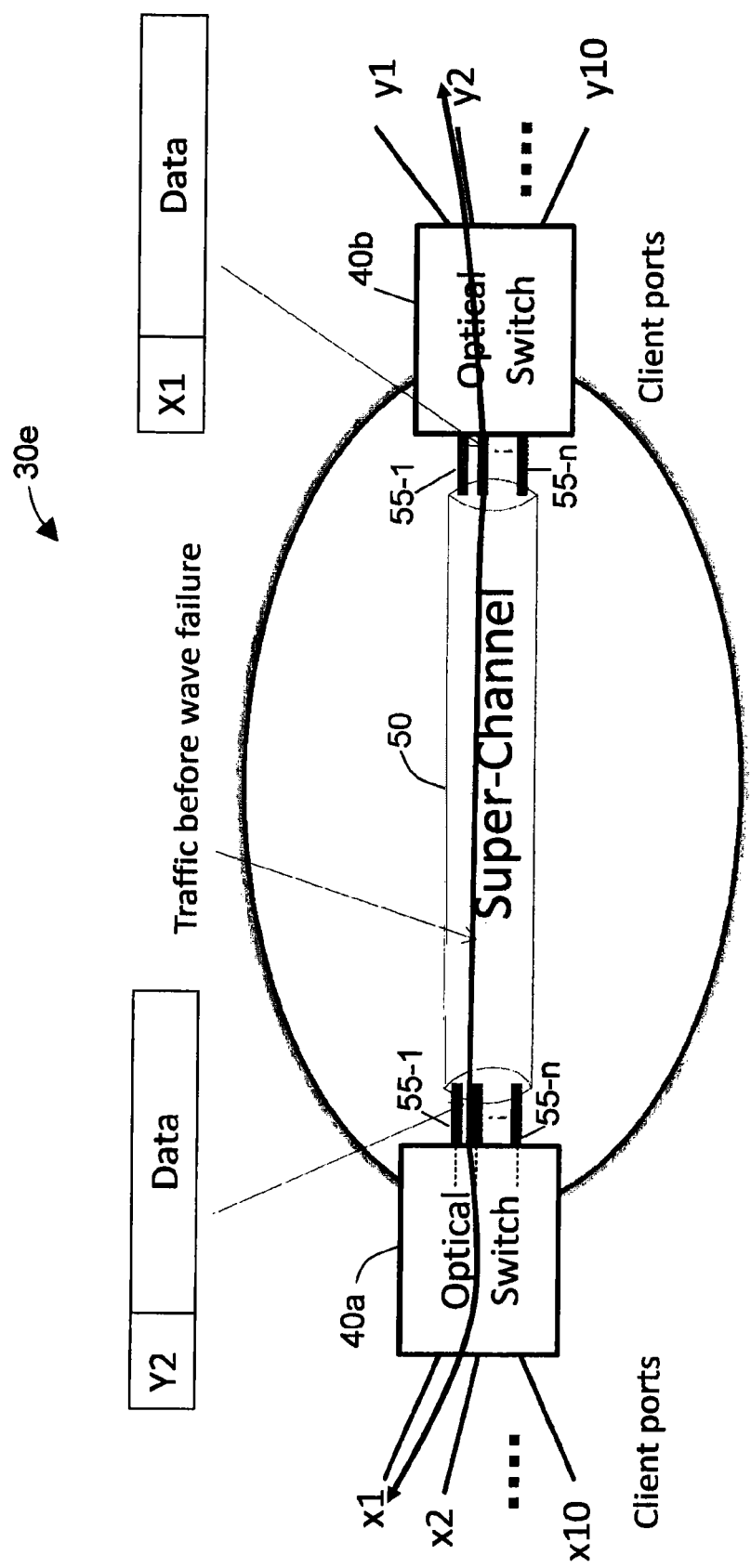
FIG. 12A is a schematic diagram of yet another exemplary optical communication network.

In one implementation of the additional data 108 encoded in the SD-FEC data field 106, the additional data 108 may comprise information for client-agnostic super-channel switching. For example, FIG. 12A is a schematic diagram of a network 30e comprising source node NE 40a, Super-Channel 50 having multiple optical carriers 55-1 . . . 55-n, and destination node NE 40b. NEs 40a and 40b may be optical switches. The optical carriers 55 may be modulated to carry the encoded additional data 108 in the SD-FEC data field 106 in-band with the wavelength of individual optical carrier 55. The additional data 108 may comprise mapping information of packets from one client port (x1, x2, . . . xn) to a remote client port (y1, y2, . . . yn), for example, x1 to y2. The mapping information may be encoded one per direction. At egress, NE 40b may extract the port number from the optical carrier and switch to the appropriate ports. The setup may be controlled from a central management system (not shown). In the example of FIG. 12A, data traffic is first carried between port x1 of NE 40a and y2 of NE 40b on modulated wavelength 55-2.

Figure 12B:
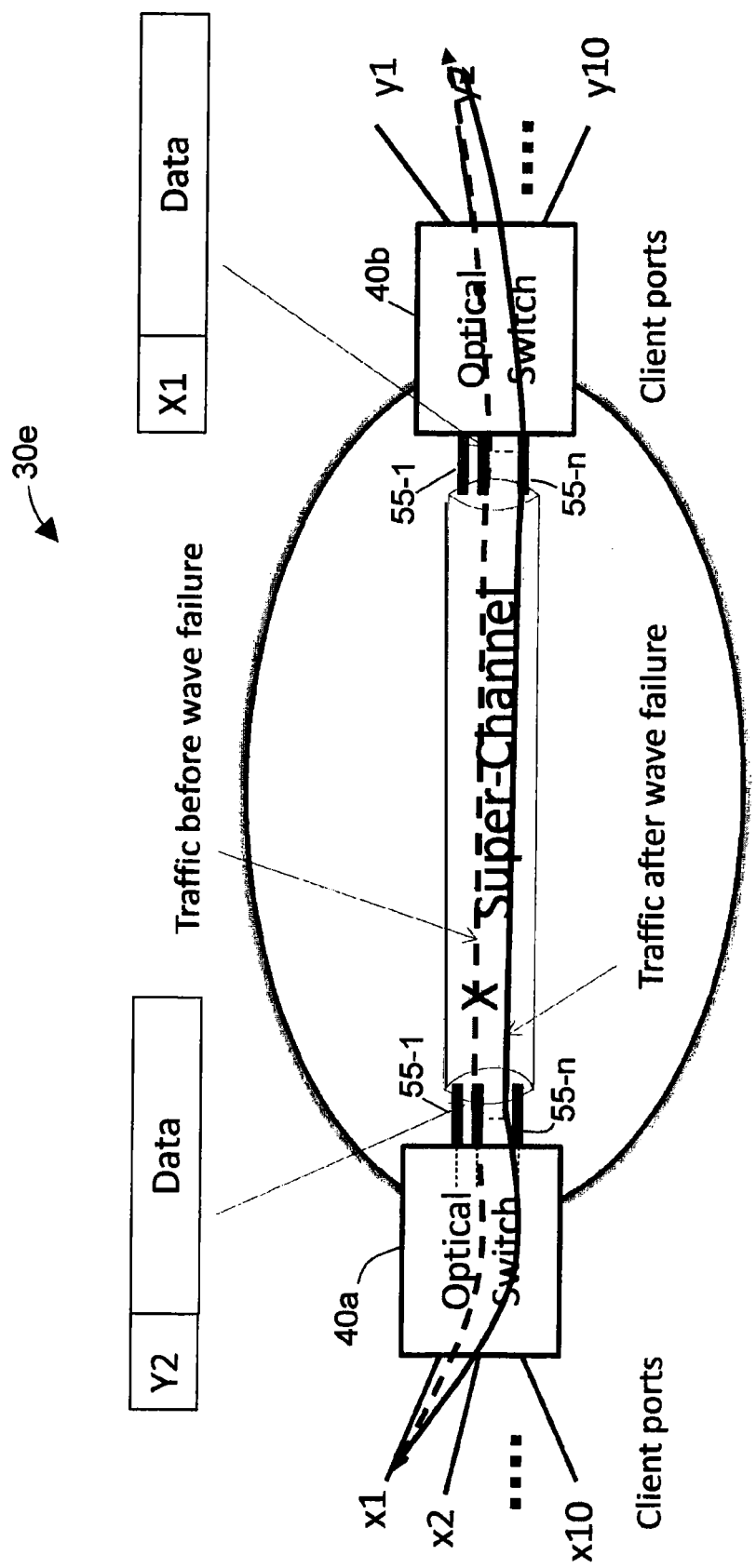
FIG. 12B is a schematic diagram of the network of FIG. 12A in which a failure has occurred.

FIG. 12B is a schematic diagram of the network of FIG. 12A in which wavelength 55-2 has failed (designated by an "X"). After the failure of the wavelength 55-2 carrying the data traffic between x1 and y2, the data traffic is rerouted across modulated wavelength 55-n. The source node NE 40a encodes mapping information in the additional data 108 of the SD-FEC data field 106 indicative of the wavelength and ports used for the data traffic. The destination node NE 40b may decode the information and switches the data traffic.

The examples described herein are exemplary uses of the additional data 108 in the SD-FEC data field 106, however, it will be understood that the additional data 108 are not limited to the examples herein. The additional data 108 in the SD-FEC data field 106 may be any communication or data that may, for example, be desirable to access without necessarily accessing the user data traffic in the payload portion 102 of the data frame 100, or for example, may be useful in an in-band communication environment.

CONCLUSION

Conventionally, in-band communication mechanisms are not available for optical connections. In accordance with the present disclosure, methods, nodes, and systems are described in which in-band client payload agnostic communication is implemented.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

In addition, information regarding the label switched paths can be stored and processed in a distributed fashion, or in a centralized fashion. One or more of the NEs 40 in the network 30 may have or access network configuration data indicative of network topology information and/or may be provided network topology information. Information indicative of topology of the network 30 may be stored on non-transitory memory. It should be understood that information indicative of topology of the network 30 may be stored on non-transitory memory and retrieved by the NEs 40. Topology information may be determined by using standard topology discovery procedures. One or more of the NEs 40 may save information indicative of the determined network topology, such as protection paths, in non-transitory memory.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

The following references are hereby incorporated herein by reference:

RFC 2328, "OSPF Version 2," Moy, J., The Internet Society, April 1998.

RFC 3209, "RSVP-TE: Extensions to RSVP for LSP Tunnels", The Internet Society, Awduche et al., December 2001.

RFC 3473 "Generalized Multi-Protocol Label Switching (GMPLS) Signaling Resource ReserVation Protocol-Traffic Engineering (RSVP-TE) Extensions," Berger (Ed.), The Internet Society, January 2003.

RFC 3945, Mannie, E., "Generalized Multi-Protocol Label Switching (GMPLS) Architecture", October 2004.

RFC 4379, "Detecting Multi-Protocol Label Switched (MPLS) Data Plane Failures," Kombella, K. and Swallow, G., The Internet Society, February 2006.

RFC 4872, "RSVP-TE Extensions for E2E GMPLS Recovery," J. P. Lang, Y. Rekhter, D. Papadimitriou, The Internet Society, May 2007.

RFC 4873, "GMPLS Segment Recovery," L. Berger et al, The Internet Society, May 2007.

G.709 ITU-T, "Interfaces for the Optical Transport Network (OTN)", G.709 Recommendation, February 2012.

G.798.1 ITU-T, "Types and characteristics of optical transport network equipment", G.798.1 Recommendation, January 2013.

G.872 ITU-T, "Architecture of optical transport networks", October 2012.

G.873.1 ITU-T, "Optical Transport Network (OTN): Linear protection", G.873.1 Jul. 2011.

What is claimed is:

1. A method comprising the steps of:
modulating, with circuitry of a source node in a communication network, at least one optical carrier to carry data utilizing a format of a soft decision forward error correction (SD-FEC) data field of an overhead portion of a data frame;

encoding, with the circuitry of the source node, first data being SD-FEC data and second data being additional data into the SD-FEC data field, the first and second data being accessible without accessing client data traffic; and transmitting, with the circuitry of the source node, the data frame including the SD-FEC data field.

2. The method of claim 1, wherein the second data comprises automatic protection switching bytes conforming to ITU-T recommendation G.873.1.

3. The method of claim 1, wherein the second data comprises network control communication information.

4. The method of claim 1, wherein the second data comprises line module discovery information.

5. The method of claim 1, wherein the second data comprises user communication information.

6. The method of claim 1, wherein the second data comprises at least one of Operation information, Administration information, and Maintenance information conforming to ITU-T recommendation G.798.1.

7. The method of claim 1, wherein the second data comprises at least one of port mapping information comprising data matching ingress ports in the source node to egress ports in a destination node to which the data frame is transmitted and switching data comprising information for switching egress ports in the destination node.

8. The method of claim 1, wherein the circuitry of the source node comprises a soft decision forward error correction line card.

9. The method of claim 1, wherein the at least one optical carrier is at least one super-channel comprising at least one optical channel containing a plurality of optical carriers.

10. The method of claim 9, wherein the additional data in the SD-FEC data fields of the overhead portion of the data frame for each optical carrier are provisioned together with one overhead communication channel.

11. The method of claim 9, wherein the additional data in the SD-FEC data fields of the overhead portion of the data frame for each optical carrier are provisioned as separate communication channels.

12. The method of claim 1, further comprising the steps of:
receiving, with circuitry of a second node in the communication network, the second node being a destination node in a path through the network, the at least one optical carrier containing the SD-FEC data field including the first and second data; and
decoding, with the circuitry of a second node, at least the second data from the at least one optical carrier, the second data being accessible without accessing client data traffic.

13. A method comprising the steps of:
detecting, by circuitry of a source node in a communication network, a failure of at least one working path between the source node and a destination node in the network, wherein the at least one working path carries data traffic in at least one optical carrier from the source node to the destination node in the network using at least one network resource when there is no failure in the working path;
switching, with circuitry of the source node, the data traffic on at least one optical carrier to a protection path through the network to the destination node, the protection path using at least one network resource different than the network resource used by the working path;
modulating, with circuitry of the source node, at least one optical carrier to carry data utilizing a format of a soft decision forward error correction (SD-FEC) data field of an overhead portion of a data frame;
encoding, with the circuitry of the source node, into the SD-FEC data field, first data being SD-FEC data and second data being additional data including automatic protection switching bytes conforming to ITU-T recommendation G.873.1; and
transmitting across the protection path, with the circuitry of the source node, the data frame including the SD-FEC data field wherein the additional data including automatic protection switching bytes contain information indicative of the working path failure and instructions to the destination node to select data traffic from the protection path.

14. The method of claim 13, wherein the circuitry of the source node comprises at least two line modules, and wherein the step of detecting the failure of at least one working path is detecting a failure of two or more working paths, the method further comprising the step of determining, with the circuitry of the source node, the line module with a greatest priority; and wherein the step of switching further comprises switching, with circuitry of the source node, the data traffic on at least one optical carrier, from at least the line module with the greatest priority, to a protection path through the network to the destination node.

15. The method of claim 13, further comprising the steps of:
receiving, by circuitry of the destination node, the data frame including the SD-FEC data field wherein the automatic protection switching bytes contain information indicative of the working path failure and instructions to the destination node to select data traffic from the protection path;
decoding, by circuitry of the destination node, the data frame; and
selecting, by circuitry of the destination node, data traffic from the protection path.

16. The method of claim 15, further comprising the steps of:
modulating, with circuitry of the destination node, at least one optical carrier to carry data utilizing a format of a SD-FEC data field of an overhead portion of a data frame;
encoding, with the circuitry of the destination node, into the SD-FEC data field, first data being SD-FEC data and second data being additional data including automatic protection switching bytes conforming to ITU-T recommendation G.873.1 indicative of confirmation of the destination node switching data traffic to the protection path; and
transmitting across the protection path, with the circuitry of the destination node, the data frame including the SD-FEC data field wherein the additional data including automatic protection switching bytes contain information indicative of confirmation of the destination node switching data traffic to the protection path.

17. The method of claim 13, further comprising the steps of:
detecting, by circuitry of the source node, clearance of the failure of the working path between the source node and a destination node in the network;
switching, with circuitry of the source node, the data traffic on at least one optical carrier from the protection path to the working path;
modulating, with circuitry of the source node, at least one optical carrier to carry data utilizing a format of a SD-FEC data field of an overhead portion of a data frame;

encoding, with the circuitry of the source node, into the SD-FEC data field, first data being SD-FEC data and second data being additional data including automatic protection switching bytes conforming to ITU-T recommendation G.873.1; and transmitting across the protection path, with the circuitry of the source node, the data frame including the SD-FEC field wherein the additional data including automatic protection switching bytes contain information indicative of the switch from the protection path to the working path and instructions to the destination node to select data traffic from the working path.

18. The method of claim 13, wherein the at least one optical carrier is at least one super-channel including a plurality of optical carriers, each of which having a corresponding one of a plurality of wavelengths and being modulated to carry a corresponding one of a plurality of data streams, each super-channel being provisioned in the network as one or more optical channel.

19. The method of claim 18, wherein the additional data in the SD-FEC data fields of the overhead portion of the data frame for each optical carrier are provisioned together with one overhead communication channel.

20. The method of claim 18, wherein the additional data in the SD-FEC data fields of the overhead portion of the data frame for each optical carrier are provisioned as separate communication channels.

21. A method comprising the steps of:

mapping, with a central controller having a processor, data traffic from at least one entry port in a first node in a communication network through at least one optical carrier on a path through the network to at least one exit port in a second node in the network, the optical carrier having a corresponding optical wavelength and being modulated to carry the data traffic, the optical wavelength further modulated to carry overhead data utilizing a format of a soft decision forward error correction (SD-FEC) data field of an overhead portion of a data frame;

encoding, with circuitry of the first node, SD-FEC data and additional data into the SD-FEC data field, the additional data comprising mapping information for the data traffic; and transmitting, with the circuitry of the first node, the additional data on the optical carrier through the network to the second node.

22. The method of claim 21, further comprising the step of:

decoding, with circuitry of the second node, the additional data; and switching, with circuitry of the second node, the data traffic based on the additional data.

* * * * *